US011228693B2

(12) United States Patent
Yoshimura et al.

(10) Patent No.: US 11,228,693 B2
(45) Date of Patent: Jan. 18, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Tomokazu Yoshimura, Kanagawa (JP); Susumu Hamada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/060,870

(22) Filed: Oct. 1, 2020

(65) Prior Publication Data

US 2021/0258442 A1 Aug. 19, 2021

(30) Foreign Application Priority Data

Feb. 17, 2020 (JP) .............................. JP2020-023960

(51) Int. Cl.
*H04N 1/00* (2006.01)
(52) U.S. Cl.
CPC ....... *H04N 1/00938* (2013.01); *H04N 1/0097* (2013.01); *H04N 1/00925* (2013.01); *H04N 2201/0094* (2013.01)

(58) Field of Classification Search
None
See application file for complete search history.

(56) References Cited

U.S. PATENT DOCUMENTS

2014/0208306 A1* 7/2014 Halder ...................... G06F 8/65
717/172
2016/0088036 A1* 3/2016 Corbin ............... H04N 21/8113
705/14.6
2019/0373130 A1* 12/2019 Han ......................... G06F 8/62

FOREIGN PATENT DOCUMENTS

JP 4394740 B2 1/2010

* cited by examiner

*Primary Examiner* — Frantz Bataille
(74) *Attorney, Agent, or Firm* — Oliff PLC

(57) ABSTRACT

An information processing apparatus includes a memory and a processor configured to cause one or more settings to be unchangeable, the one or more settings being required for running software to be installed onto the information processing apparatus, the software having been determined to be operable after installed.

10 Claims, 12 Drawing Sheets

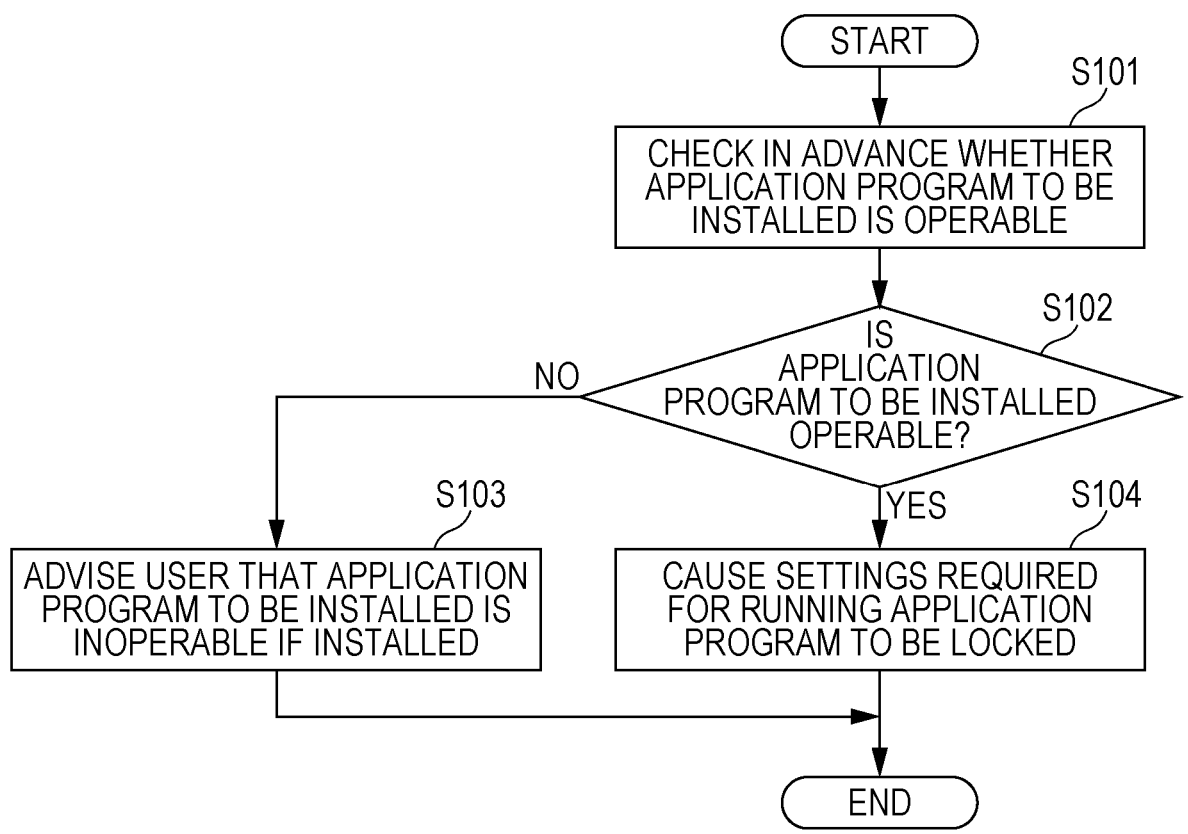

FIG. 5

| NAME OF APPLICATION PROGRAM | SETTING CONDITION 1 | SETTING CONDITION 2 | ... | SETTING CONDITION N |
|---|---|---|---|---|
| APPLICATION PROGRAM A | AUTHENTICATION MODE NEEDS TO BE SET TO "LOCAL AUTHENTICATION" | SETTING FOR ENABLING OR DISABLING PRIVATE PRINTING NEEDS TO BE SET TO "ENABLED" | ... | ... |
| APPLICATION PROGRAM B | PROXY SERVER NEEDS TO BE CONFIGURED | SETTING FOR ENABLING OR DISABLING VERIFICATION OF SERVER CERTIFICATE NEEDS TO BE SET TO "ENABLED" | ... | ... |
| ... | ... | ... | ... | ... |
| APPLICATION PROGRAM X | ... | ... | ... | ... |

FIG. 9

| NAME OF APPLICATION PROGRAM | SETTING 1 | TEMPORARY CHANGE | TIME OF CHANGE | SETTING 2 | TEMPORARY CHANGE | TIME OF CHANGE |
|---|---|---|---|---|---|---|
| APPLICATION PROGRAM A | AUTHENTICATION MODE IS SET TO "LOCAL AUTHENTICATION" | | | SETTING FOR ENABLING OR DISABLING PRIVATE PRINTING IS SET TO "ENABLED" | | |
| APPLICATION PROGRAM B | PROXY SERVER IS CONFIGURED | | | SETTING FOR ENABLING OR DISABLING VERIFICATION OF SERVER CERTIFICATE IS SET TO "ENABLED" | | |

FIG. 11

| NAME OF APPLICATION PROGRAM | SETTING 1 | TEMPORARY CHANGE | TIME OF CHANGE | SETTING 2 | TEMPORARY CHANGE | TIME OF CHANGE |
|---|---|---|---|---|---|---|
| APPLICATION PROGRAM A | AUTHENTICATION MODE IS SET TO "LOCAL AUTHENTICATION" | | | SETTING FOR ENABLING OR DISABLING PRIVATE PRINTING IS SET TO "ENABLED" | | |
| APPLICATION PROGRAM B | PROXY SERVER IS CONFIGURED | | | SETTING FOR ENABLING OR DISABLING VERIFICATION OF SERVER CERTIFICATE IS SET TO "ENABLED" | REMAIN CHANGED | 18:26 1/9/2020 |

FIG. 13 to: kanrisha@abcdefg.co.jp
from: abc7373@aaaa.com

To Machine Administrator

The following setting, which is required for running Application
Program B to be installed, had been temporarily changed,
but the temporarily changed setting has been forcibly replaced
by the original setting.

Verification of Server Certificate: "Enabled"

Time that the setting was changed: 19:26 January 9, 2020
    Machine Name: abc7373

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-023960 filed Feb. 17, 2020.

BACKGROUND

(i) Technical Field

The present disclosure relates to an information processing apparatus and a non-transitory computer readable medium.

(ii) Related Art

Japanese Patent No. 4394740 discloses an image forming apparatus that allows installation of an application program to start if it is determined in an advance check that the application program can be installed. The advance check is performed before the installation of the application program to determine whether the application program can be installed.

SUMMARY

Aspects of non-limiting embodiments of the present disclosure relate to providing an information processing apparatus and a non-transitory computer readable medium storing a program that can avoid occurrence of a situation in which software that is determined to be operable if installed becomes inoperable when actually installed because of a change made to a setting.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

INFORMATION PROCESSING APPARATUS

According to an aspect of the present disclosure, there is provided an information processing apparatus including
a memory, and
a processor configured to
cause one or more settings to be unchangeable, the one or more settings being required for running software to be installed onto the information processing apparatus, the software having been determined to be operable after installed.

BRIEF DESCRIPTION OF THE DRAWINGS

An exemplary embodiment of the present disclosure will be described in detail based on the following figures, wherein:

FIG. 4 is a flowchart for describing an operation in which one or more locked settings are not allowed to be temporarily changed in an examination of whether an application program to be installed is operable on the image forming apparatus according to the exemplary embodiment of the present disclosure, the examination being performed by using a check program;

FIG. 5 is an illustration depicting examples of setting conditions that depend on a type of an application program to be installed;

FIG. 9 is an illustration depicting an example of a required-setting management table stored in a required-setting management table repository;

FIG. 11 is an illustration depicting an example of the required-setting management table stored in the required-setting management table repository, the required-setting management table retaining a temporary change;

FIG. 13 is an illustration depicting an example email to advise a machine administrator that such a change as undoes a temporary change that had been made to the setting has been done.

DETAILED DESCRIPTION

An exemplary embodiment of the present disclosure will be described in detail with reference to the drawings.

Figure 1:
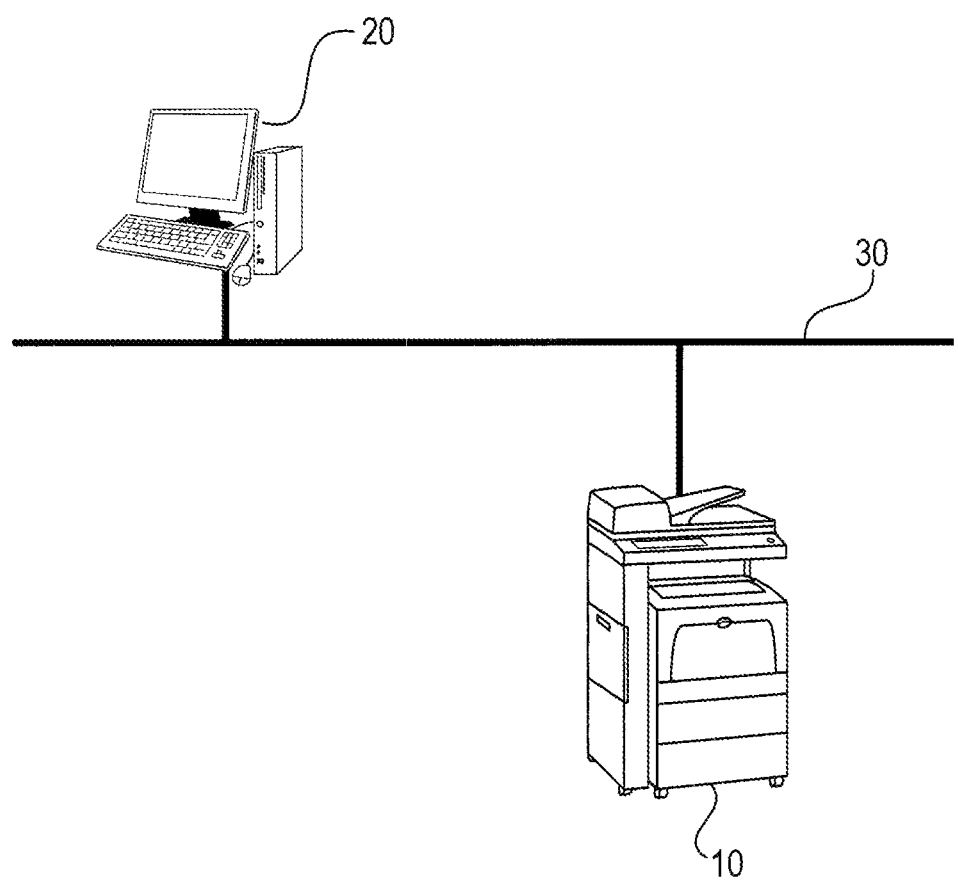
FIG. 1 is an illustration depicting a system configuration of an image forming system according to the exemplary embodiment of the present disclosure.

FIG. 1 is an illustration depicting a configuration of an image forming system according to the exemplary embodiment of the present disclosure.

As depicted in FIG. 1, the image forming system according to the exemplary embodiment of the present disclosure includes an image forming apparatus 10 and a terminal apparatus 20, which are connected to each other by using a network 30. The terminal apparatus 20 creates print data and transmits the created print data to the image forming apparatus 10 via the network 30. The image forming apparatus 10 accepts the print data transmitted from the terminal apparatus 20 and outputs an image based on the print data on a sheet of paper. The image forming apparatus 10 has a plurality of functions such as a print function, a scan function, a copying function, and a facsimile function and is a so-called multifunction peripheral.

The image forming apparatus 10 according to the present exemplary embodiment is configured so that software called an application program is installed and thereby various functions can be added.

However, when such an application program is installed onto the image forming apparatus 10, the application program does not necessarily run properly. Operating requirements for the application program to run properly need to be satisfied for the installed application program to run properly. Specifically, various settings of the image forming apparatus 10 need to be configured so as to conform to requirements for running the installed application program.

Thus, when an application program is to be installed onto the image forming apparatus 10, the application program is sometimes checked in advance to determine whether the application program is operable if installed. For example, in some cases, when an engineer from a manufacturer, who is called a customer engineer, installs a new application program onto the image forming apparatus 10, a user called a machine administrator uses a check program for examining whether the application program is properly operable and examines in advance before a visit from the customer engineer whether the application program is properly operable on the image forming apparatus 10.

In such a case, if a setting required for running the installed application program is changed by another user after the installed application program is determined to be operable, a situation in which the application program does not run if installed arises.

Thus, the image forming apparatus 10 according to the present exemplary embodiment has a configuration described below and thereby avoids the occurrence of a situation in which an application program that is determined in advance to be operable if installed becomes inoperable when actually installed because of a change made to a setting.

Figure 2:
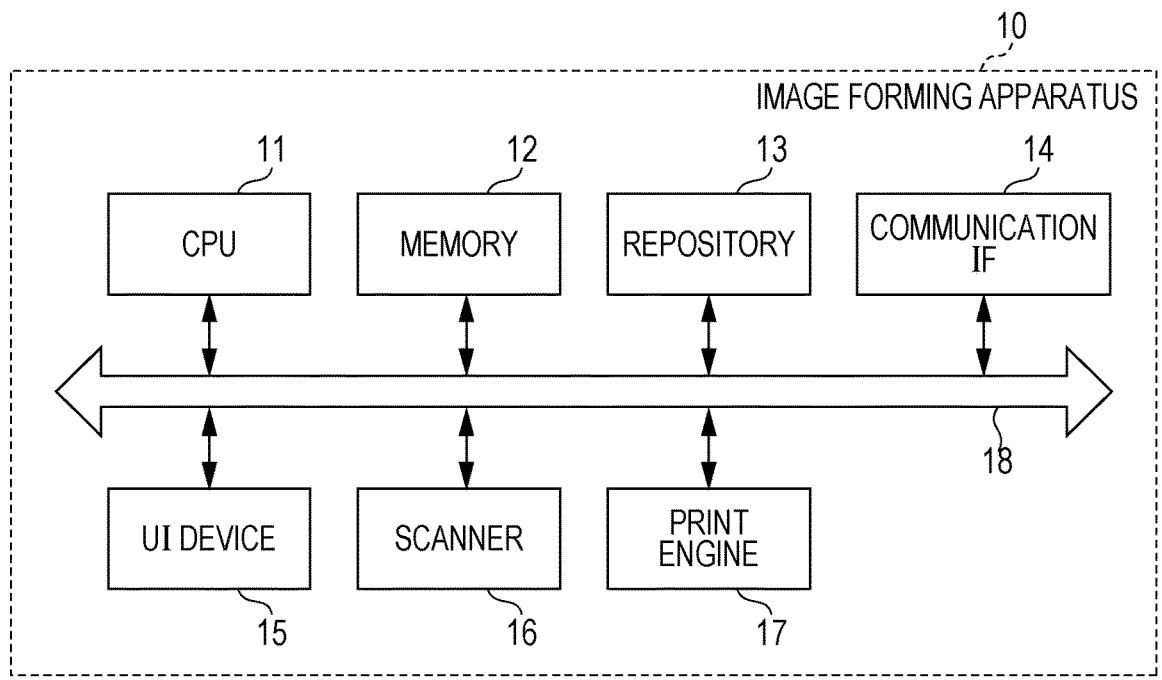
FIG. 2 is a block diagram depicting a hardware configuration of an image forming apparatus according to the exemplary embodiment of the present disclosure.

Next, FIG. 2 depicts a hardware configuration of the image forming apparatus 10 in the image forming system according to the present exemplary embodiment.

As depicted in FIG. 2, the image forming apparatus 10 includes a central processing unit (CPU) 11, a memory 12, a repository 13 such as a hard disk drive, a communication interface (abbreviated to IF) 14 that transmits and receives data to and from an external apparatus and the like via the network 30, a user-interface (abbreviated to UI) device 15 including a touch panel or a combination of a liquid crystal display and a keyboard, a scanner 16, and a print engine 17. These building units are connected to each other by using a control bus 18.

The print engine 17 prints an image on a recording medium such as a sheet of printing paper after performing processes such as charging, exposure, development, transfer, and fixing.

The CPU 11 is a processor that performs predetermined processing in accordance with a control program stored in the memory 12 or in the repository 13 and that controls operations of the image forming apparatus 10. Although the description in the present exemplary embodiment will be given assuming that the CPU 11 reads and executes the control program stored in the memory 12 or in the repository 13, it is also possible to provide the CPU 11 with a program stored in a storage medium such as a compact-disc read-only memory (CD-ROM).

Figure 3:
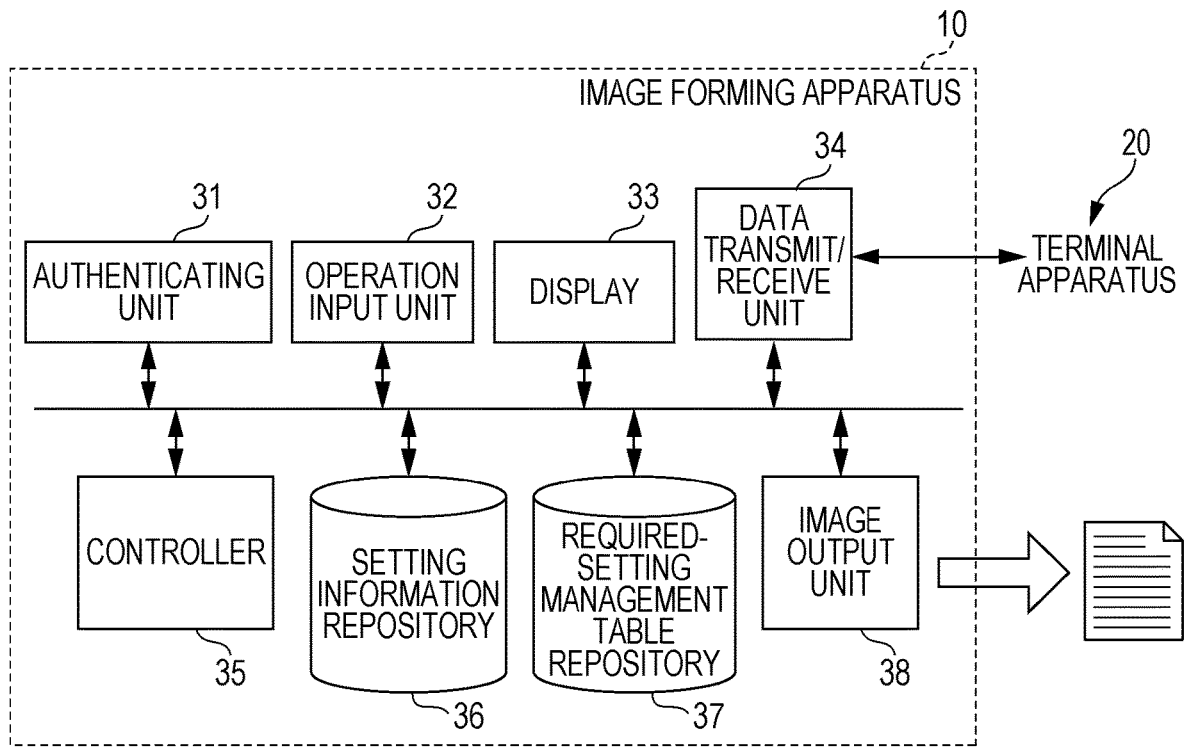
FIG. 3 is a block diagram depicting a functional configuration of the image forming apparatus according to the exemplary embodiment of the present disclosure.

FIG. 3 is a block diagram depicting a functional configuration of the image forming apparatus 10 realized by running the control program described above.

As depicted in FIG. 3, the image forming apparatus 10 according to the present exemplary embodiment includes an authenticating unit 31, an operation input unit 32, a display 33, a data transmit/receive unit 34, a controller 35, a setting information repository 36, a required-setting management table repository 37, and an image output unit 38.

The authenticating unit 31 performs an authentication process for a user who is to use the image forming apparatus 10. Users who use the image forming apparatus 10 are divided into two types of users, which are a general user and a machine administrator. The machine administrator is, for example, a user selected for administering the image forming apparatus 10 in an organization that uses the image forming apparatus 10 and is empowered to perform a setting change that a general user is not allowed to perform and to use various functions that a general user is not allowed to use. The authenticating unit 31 determines whether a user who uses the image forming apparatus 10 is a machine administrator or a general user.

The data transmit/receive unit 34 transmits and receives data to and from an external apparatus such as the terminal apparatus 20.

The controller 35 creates print data in accordance with a print job received from the terminal apparatus 20 via the data transmit/receive unit 34 and controls the image output unit 38 to output created print data.

The display 33 is controlled by the controller 35 and displays various kinds of information to a user. The operation input unit 32 receives information regarding various operations performed by the user.

The image output unit 38 outputs an image on a recording medium such as a sheet of printing paper in accordance with control by the controller 35.

The setting information repository 36 stores setting information needed for the image forming apparatus 10 to perform various functions. The controller 35 controls operations of the image forming apparatus 10 in accordance with the setting information stored in the setting information repository 36.

When an application program is to be installed onto the image forming apparatus 10, a check is performed by using a check program that is created for examining whether the application program is properly operable if installed. Specifically, the controller 35 examines whether an application program is properly operable if installed by using a program such as a check program that is introduced from outside. Then, the required-setting management table repository 37 stores one or more settings required for running the application program to be installed.

If it is determined that the application program to be installed into the image forming apparatus 10 is operable after installed, the controller 35 causes the one or more settings required for running the application program to be locked and unchangeable.

Since the one or more settings required for proper operations vary depending on the type of the application program, the controller 35 causes different one or more settings to be locked and unchangeable in accordance with the type of the application program to be installed.

The controller 35 causes one or more settings to be locked and unchangeable, the one or more settings being at least related to communication, if the application program to be installed realizes a service provided by using a communication unit that communicates with an external service.

Further, the controller 35 causes one or more settings to be locked and unchangeable, the one or more settings being at least related to authentication, if the authenticating unit 31 needs to be used to execute the application program to be installed.

In some cases, difficulties arise if a certain setting, for example, which is required for running an application program, is locked and made unchangeable. For example, if a user has to urgently perform an operation, which is hindered because a certain setting is unchangeable, the operation cannot be performed.

Thus, if a setting required for running an application program to be installed is caused to be unchangeable, the controller 35 may allow the locked setting to be temporarily changed in accordance with a request of the user.

However, once such a temporary change is allowed, if the changed setting is left as it is, the application program that is installed is not properly operable.

Accordingly, if such a temporary change is allowed, the controller 35 causes the required-setting management table repository 37 to store the setting required for running the application program to be installed and causes at a predetermined timing the temporarily changed setting to be replaced by the setting stored in the required-setting management table repository 37.

For example, when a predetermined period, for example, an hour has elapsed after the change made to the setting, the controller 35 causes the temporarily changed setting to be replaced by the setting stored in the required-setting management table repository 37.

Further, for example, after the usage of a service provided in the temporarily changed setting is finished, the controller 35 causes the temporarily changed setting to be replaced by the setting stored in the required-setting management table repository 37.

Further, for example, before the application program starts to be installed, the controller 35 causes the temporarily changed setting to be replaced by the setting stored in the required-setting management table repository 37. Alternatively, before the application program is launched after installed, the controller 35 causes the temporarily changed setting to be replaced by the setting stored in the required-setting management table repository 37.

Next, an operation of the image forming apparatus 10 according to the present exemplary embodiment will be described in detail with reference to the drawings.

First, with reference to the flowchart depicted in FIG. 4, a description will be given of an operation in which such a check program as described above is used for examining whether an application program to be installed is operable on the image forming apparatus 10 according to the present exemplary embodiment. The flowchart depicted in FIG. 4 will describe an operation in which a locked setting is not allowed to be temporarily changed.

In step S101, the controller 35 checks whether the current settings of the image forming apparatus 10 satisfy setting conditions required for running an application program to be installed. The setting conditions are determined in accordance with the type of the application program.

The setting conditions required for running an application program vary depending on the type of the application program. Examples of such setting conditions depending on the type of the application program are depicted in FIG. 5. For example, FIG. 5 illustrates that to properly run an application program named "Application Program A" on the image forming apparatus 10, two setting conditions need to be satisfied. One setting condition is that the authentication mode needs to be set to "local authentication", and the other setting condition is that the setting for enabling or disabling private printing needs to be set to "enabled".

The term "local authentication" indicates a setting such that an authenticating device installed into the image forming apparatus 10 authenticates identification of a user. The term "private printing" indicates a function of performing a printing process for a print job in response to printing instructions provided by a user instead of performing the printing process immediately after the user transmits the print job to the image forming apparatus 10. The user provides the printing instructions by using an operation panel 40 of the image forming apparatus 10 after having undergone an authentication process.

In other words, when the application program named "Application Program A" is examined in advance whether the application program is properly operable, the controller 35 checks by using the check program that the two setting conditions are satisfied, that is, the authentication mode is set to "local authentication" and the setting for enabling or disabling private printing is set to "enabled".

Then, in step S102, in accordance with the check result, the controller 35 determines whether the application program to be installed is operable on the image forming apparatus 10.

If it is determined in step S102 that the application program to be installed is inoperable on the image forming apparatus 10, the controller 35 advises the user that the application program is inoperable if installed, for example, by displaying a message on the display 33 in step S103.

If it is determined in step S102 that the application program to be installed is operable on the image forming apparatus 10, the controller 35 causes one or more settings required for running the application program to be locked and unchangeable in step S104.

Next, an operation of the image forming apparatus 10, which is in a condition in which the one or more settings required for running the application program to be installed are locked and unchangeable, will be described with reference to FIGS. 6 and 7.

In this example, a case where such an authentication mode as is described above is set to "local authentication" and locked will be described.

Figure 6:
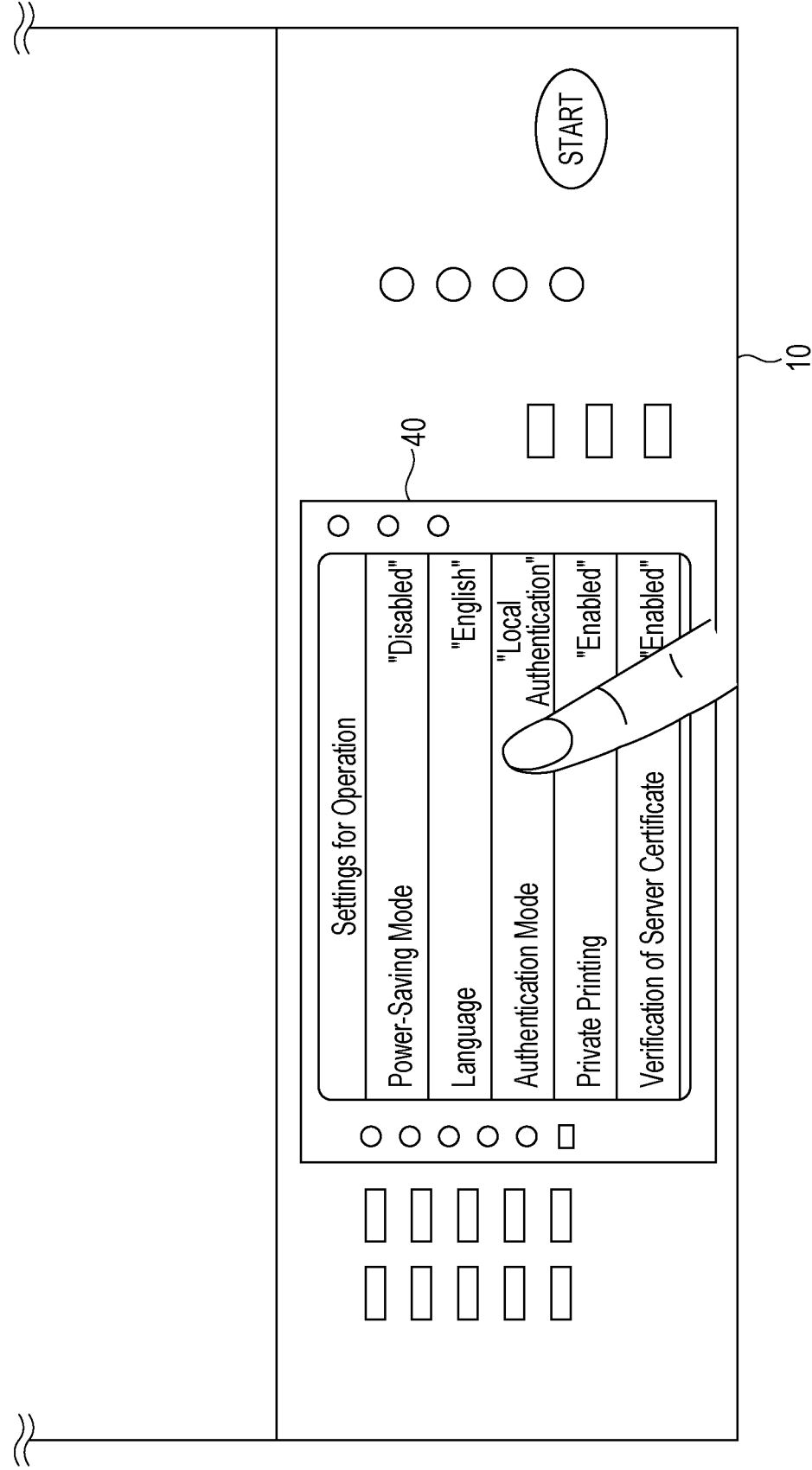
FIG. 6 is an illustration for describing a situation in which a user, who is going to change an authentication mode, has selected a setting item named "authentication mode" displayed on an operation panel.
Figure 7:
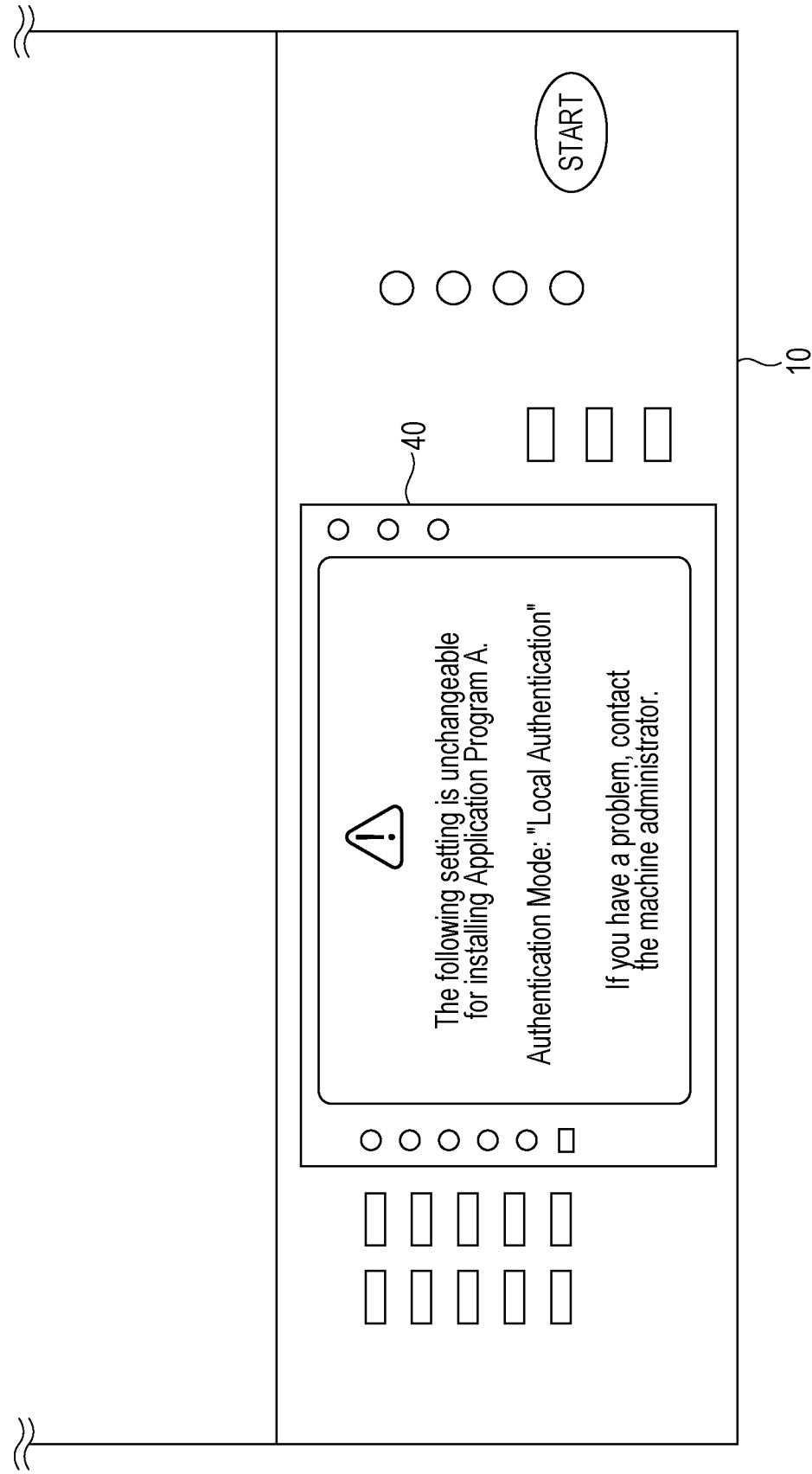
FIG. 7 is an illustration for describing presented content displayed on the operation panel by the operation depicted in FIG. 6.

In such a situation, as described in FIG. 6, if a user, who is going to change the authentication mode, selects a setting item named "authentication mode" displayed on the operation panel 40, such an indication as is depicted in FIG. 7 is displayed on the operation panel 40.

In FIG. 7, a message "The following setting is unchangeable for installing Application Program A." is displayed on the operation panel 40, and this message indicates that the authentication mode is unchangeable from "local authentication" to other settings.

Next, an operation in which one of the locked settings is allowed to be temporarily changed will be described with reference to the flowchart in FIG. 8.

Figure 8:
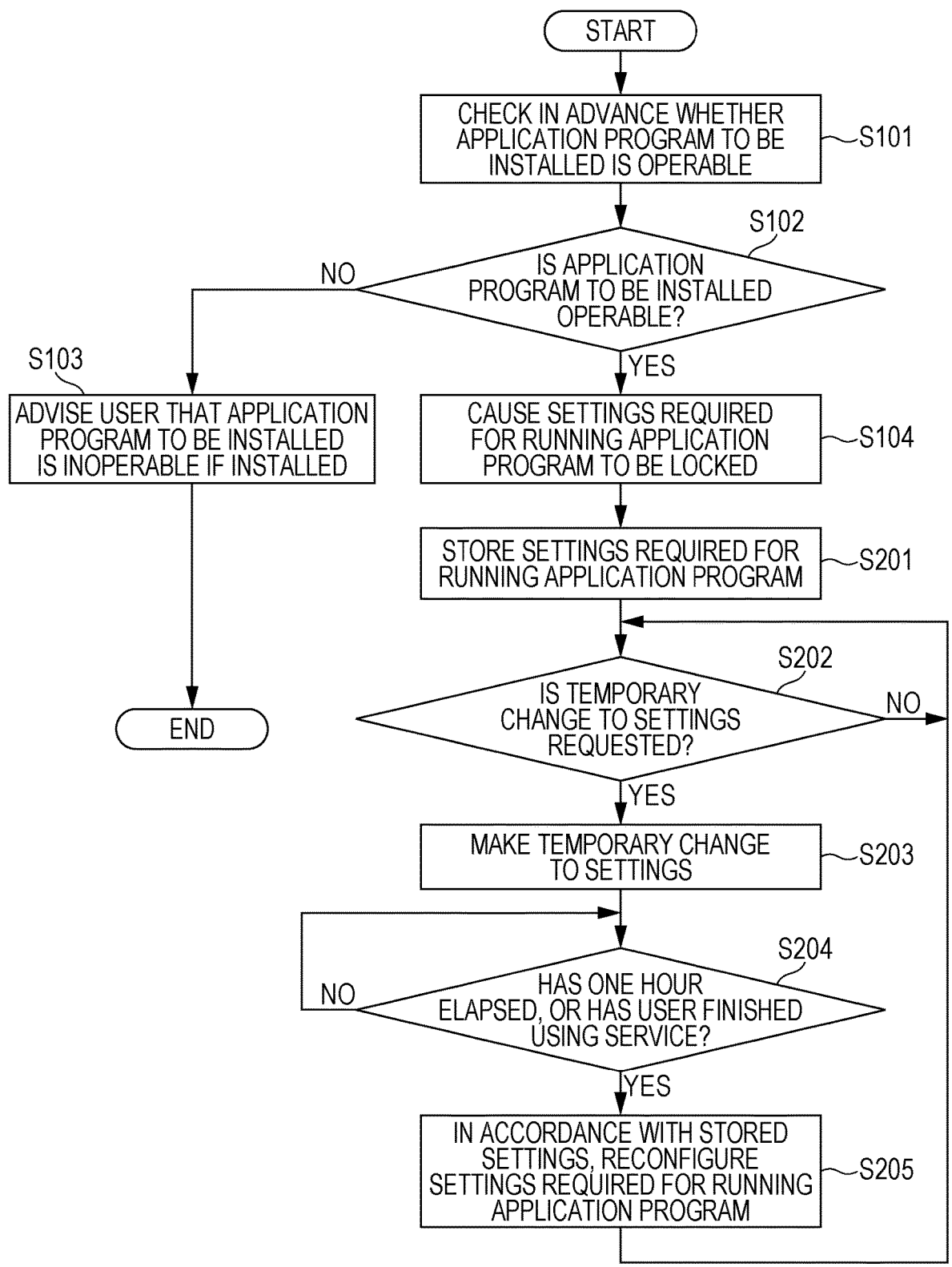
FIG. 8 is a flowchart for describing an operation in which a locked setting is allowed to be temporarily changed in an examination of whether an application program to be installed is operable on the image forming apparatus according to the exemplary embodiment of the present disclosure, the examination being performed by using a check program.

Since the flowchart in FIG. 8 is obtained by adding processes in steps S201 to S205 to the flowchart depicted in FIG. 4, the steps S101 to S104, which are described with reference to the flowchart in FIG. 4, will not be described again.

In the flowchart in FIG. 8, after the settings required for running the application program are caused to be locked and unchangeable in step S104, the controller 35 causes the required-setting management table repository 37 to store in step S201 the settings required for running the application program to be installed.

FIG. 9 depicts an example of a required-setting management table stored in the required-setting management table repository 37 in this way. Referring to FIG. 9, for the application program named "Application Program A", the required-setting management table retains, as the settings required for running the application program, settings in which the authentication mode is set to "local authentication" and the setting for enabling or disabling private printing is set to "enabled".

Also referring to FIG. 9, for the application program named "Application Program B", the required-setting management table retains, as the settings required for running the application program, settings in which a proxy server is configured and the setting for enabling or disabling verification of a server certificate is set to "enabled".

Then, if a user requests in step S202 that a temporary change be made to such locked settings, the controller 35 allows the temporary change to be made to such locked settings in step S203.

Figure 10:
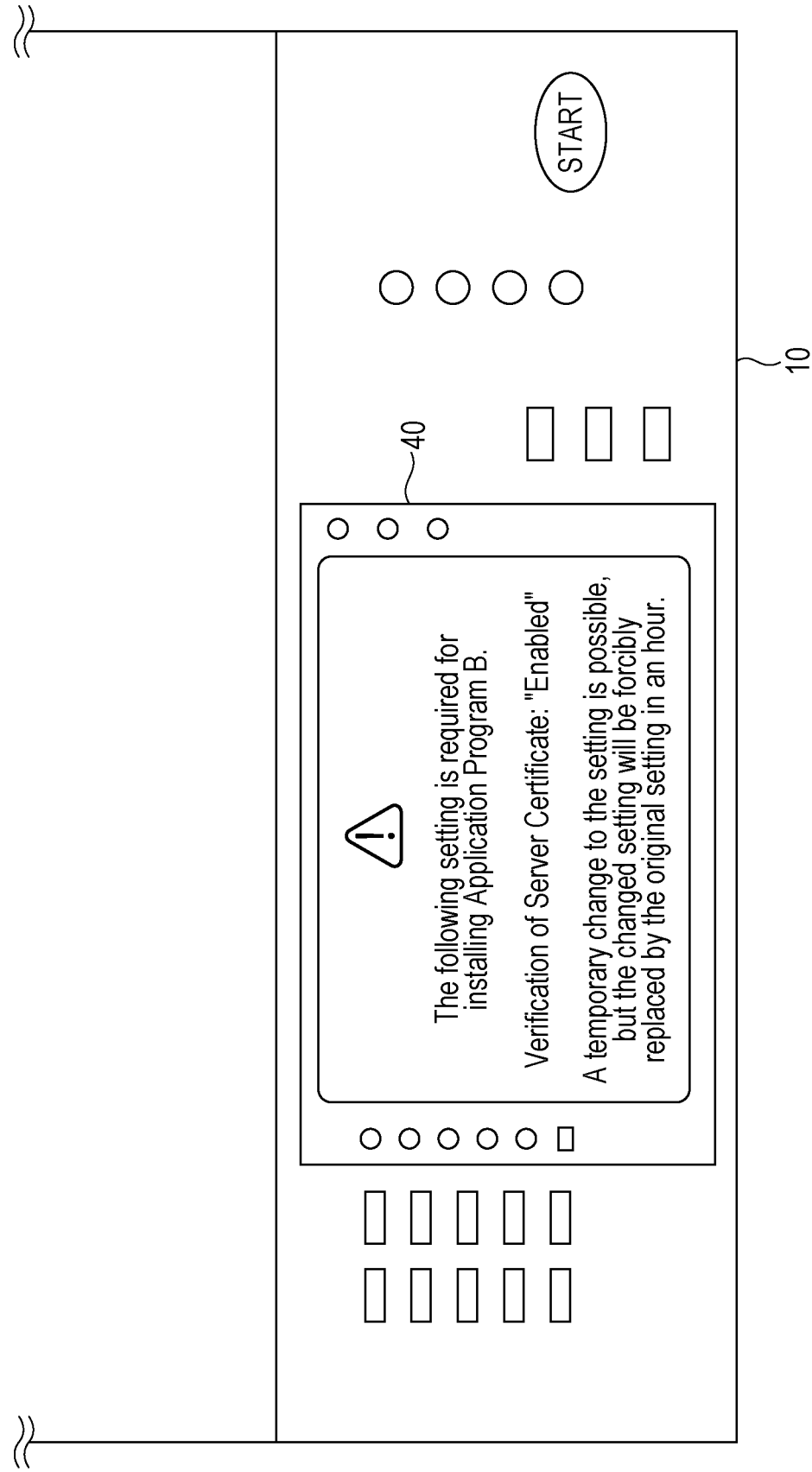
FIG. 10 is an illustration depicting an example of an operation screen presented to the user to allow a temporary change to be made to a locked setting.

For example, FIG. 10 depicts an example of an operation screen presented to a user who has requested that a temporary change be made to locked settings. The operation screen is presented to allow the user to make the temporary change to the locked settings.

In this example, a description will be given of a case where a user wants to temporarily change the setting for enabling or disabling verification of a server certificate to "disabled" so as to temporarily connect to an old service in which a server certificate is not properly configured.

In the example of the operation screen depicted in FIG. 10, the operation panel 40 displays a message "The following setting is required for installing Application Program B. A temporary change to the setting is possible, but the changed setting will be forcibly replaced by the original setting in an hour." The message indicates that the user is advised that the change to the setting regarding the verification of a server certificate is temporarily allowed but is forcibly undone in an hour.

In this example, a description will be given of a case where the user, who has recognized the message depicted in FIG. 10, temporarily changes the setting for enabling or disabling verification of a server certificate to "disabled".

If such a change to the setting has been effected, the controller 35 causes the required-setting management table repository 37 to store the fact that the temporary change has been effected. FIG. 11 depicts an example of the required-setting management table retaining the temporary change in this way in the required-setting management table repository 37.

Reference to FIG. 11 indicates that the required-setting management table retains a situation in which the setting for enabling or disabling verification of a server certificate has been temporarily changed. In this situation, the setting for enabling or disabling verification of a server certificate, the setting being one of the settings required for running the Application Program B, has been temporarily changed because the user has changed the setting for enabling or disabling verification of a server certificate to "disabled". FIG. 11 indicates that the information regarding the time of the change is also retained so as to forcibly replace the temporarily changed setting by the original setting when an hour has elapsed after the time of the change.

Then, if it is determined in step S204 that an hour, which is the predetermined time, has elapsed after the temporary change effected by the user or that the user has finished using a service for which the setting has been changed, the controller 35 reconfigures in step S205 the settings required for running the application program in accordance with the settings stored in the required-setting management table repository 37.

Specifically, the controller 35 performs such a process as changes the setting for enabling or disabling verification of a server certificate from "disabled" back to "enabled" in the setting information stored in the setting information repository 36.

The timing of performing reconfiguration in which the temporarily changed setting is replaced by the original setting may be set not only to the time that the predetermined period elapses after the change is effected or the time that the user finishes using the service but also to the time that the application program is installed onto the image forming apparatus 10, the time before the installed application program is launched, or the like. In other words, any time before the installed application program is launched and starts running may be selected.

Figure 12:
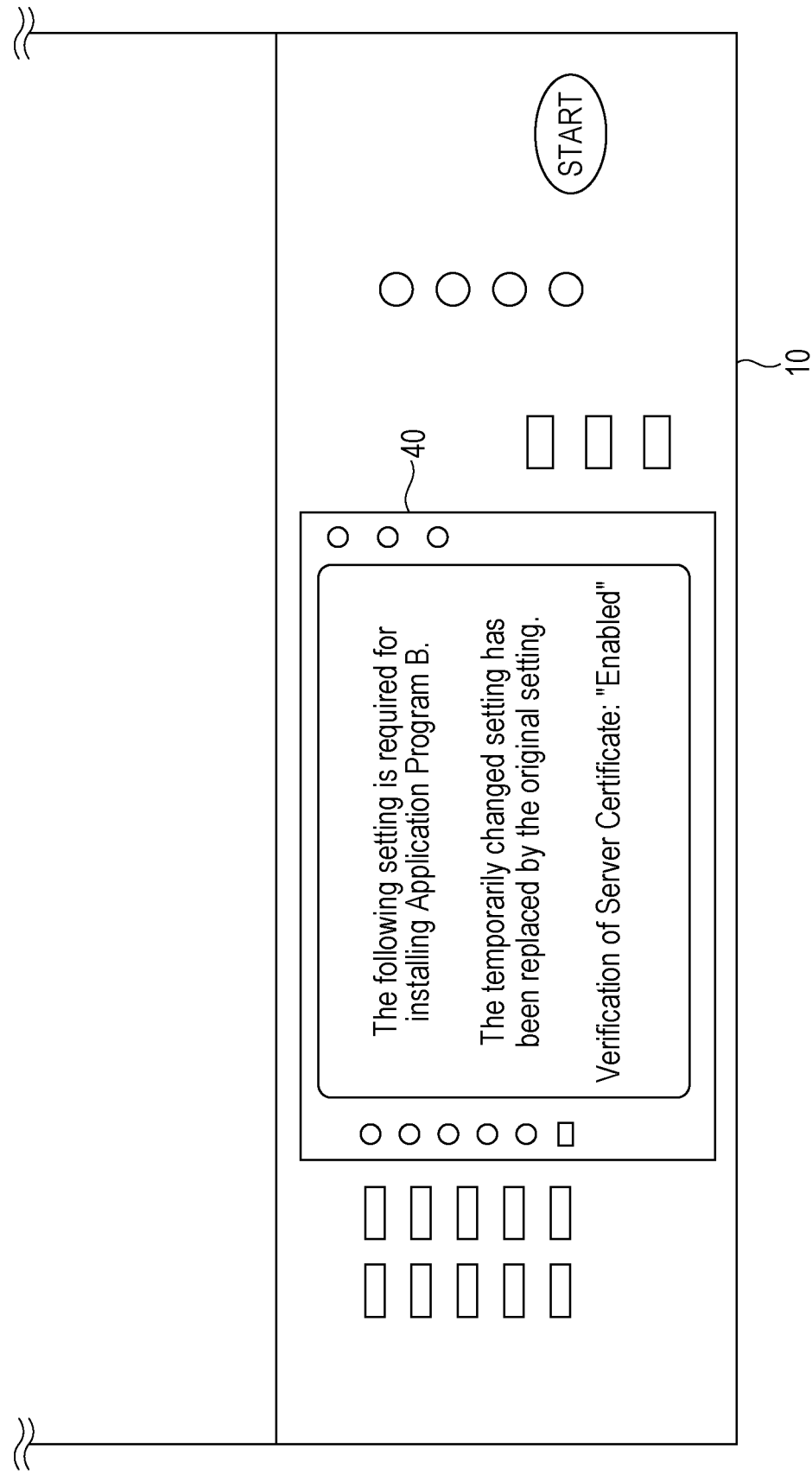
FIG. 12 is an illustration depicting an example presentation screen on the operation panel to advise the user that such a change as undoes a temporary change that had been made to the setting has been done.

Then, the controller 35 displays such a message as is depicted, for example, in FIG. 12 on the operation panel 40 and thereby advises the user that such a change as replaces the temporarily changed setting by the original setting has been effected.

Since the user does not necessarily view the operation panel 40, the controller 35 may transmit such an email as is depicted, for example, in FIG. 13 to the address of the machine administrator, which is registered in advance.

Further, such an email as is depicted in FIG. 13 may be transmitted to the user who has changed the setting. However, in this case, the required-setting management table depicted in FIG. 11 needs to retain user information or address information of the user who has changed the setting along with the information regarding the time that the temporary change is made to the settings.

In the embodiment above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

MODIFICATION

In the above exemplary embodiment, the case where the application program is installed onto the image forming apparatus has been described, but the present disclosure is not limited to the above exemplary embodiment. The present disclosure can also be similarly applied in a case where the application program is installed onto an information processing apparatus other than an image forming apparatus, such as a personal computer or a smartphone.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a memory; and
   a processor configured to:
   determine whether current settings of the information processing apparatus satisfy setting conditions required for running software to be installed onto the information processing apparatus; and
   when the current settings satisfy the setting conditions, cause one or more of the current settings to be unchangeable.

2. The information processing apparatus according to claim 1, wherein the processor is configured to:
   cause the one or more settings to be unchangeable in accordance with a type of the software to be installed, the one or more settings being different for each type of the software.

3. The information processing apparatus according to claim 2, wherein the processor is configured to:
   cause the one or more settings to be unchangeable, the one or more settings being at least related to communication, if the software to be installed realizes a service provided by using a communication unit that communicates with an external service.

4. The information processing apparatus according to claim 2, wherein the processor is configured to:
   cause the one or more settings to be unchangeable, the one or more settings being at least related to authentication, if an authenticating unit needs to be used to execute the software to be installed.

5. The information processing apparatus according to claim 1, wherein
   the memory stores the one or more settings required for running the software to be installed, and
   if the one or more settings required for running the software to be installed are caused to be unchangeable, the processor is configured to:
   allow at least one of the one or more settings to be temporarily changed in accordance with a request of a user; and
   cause at a predetermined timing the at least one of the one or more settings that has been temporarily changed to be replaced by a corresponding one of the one or more settings stored in the memory.

6. The information processing apparatus according to claim 5, wherein after usage of a service is finished, the service being provided in the at least one of the one or more settings that has been temporarily changed, the processor is configured to:
   cause the at least one of the one or more settings that has been temporarily changed to be replaced by the corresponding one of the one or more settings stored in the memory.

7. The information processing apparatus according to claim 5, wherein before installation of the software starts, the processor is configured to:
   cause the at least one of the one or more settings that has been temporarily changed to be replaced by the corresponding one of the one or more settings stored in the memory.

8. The information processing apparatus according to claim 5, wherein after the software is installed and before the software is launched, the processor t is configured to:
   cause the at least one of the one or more settings that has been temporarily changed to be replaced by the corresponding one of the one or more settings stored in the memory.

9. A non-transitory computer readable medium storing a program causing a computer to execute a process for information processing on an information processing apparatus, the process comprising:
   determining whether current settings of the information processing apparatus satisfy setting conditions required for running software to be installed onto the information processing apparatus; and
   when the current settings satisfy the setting conditions, causing one or more settings to be unchangeable, the one or more settings being required for running software to be installed onto the computer, the software having been determined to be operable after installed.

10. An information processing apparatus comprising:
    a memory; and
    means for determining whether current settings of the information processing apparatus satisfy setting conditions required for running software to be installed onto the information processing apparatus; and
    when the current settings satisfy the setting conditions, means for causing one or more of the settings to be unchangeable.

* * * * *